United States Patent [19]

Collings et al.

[11] Patent Number: 4,850,337
[45] Date of Patent: Jul. 25, 1989

[54] SOLAR ENERGY APPARATUS WITH APERTURED SHIELD

[75] Inventors: Roger J. Collings; David G. Bannon, both of Rockford, Ill.

[73] Assignee: Sundstrand Corporation, Rockford, Ill.

[21] Appl. No.: 948,231

[22] Filed: Dec. 31, 1986

[51] Int. Cl.⁴ .............................................. F24J 2/00
[52] U.S. Cl. .................................... 126/417; 126/450; 126/426
[58] Field of Search ............... 126/417, 450, 426, 438, 126/400, 438, 440

[56] References Cited

U.S. PATENT DOCUMENTS

| | | |
|---|---|---|
| 3,006,818 | 10/1961 | Lappala et al. ................ 126/450 X |
| 3,234,931 | 2/1966 | Whitaker .............................. 126/417 |
| 3,927,659 | 12/1975 | Blake et al. ..................... 126/450 X |
| 4,090,498 | 5/1978 | Benson . |
| 4,426,995 | 1/1984 | Wilson ............................ 126/417 X |
| 4,479,485 | 10/1984 | McDougal et al. . |
| 4,502,466 | 3/1985 | Grahm . |
| 4,552,212 | 11/1985 | Nuttle ............................. 126/426 X |
| 4,598,695 | 7/1986 | Niggemann ..................... 126/417 X |

Primary Examiner—Randall L. Green
Attorney, Agent, or Firm—Wood, Dalton, Phillips, Mason & Rowe

[57] ABSTRACT

A protective apertured shield for use about an inlet to a solar apparatus which includesd a cavity receiver for absorbing concentrated solar energy. A rigid support truss assembly is fixed to the periphery of the inlet and projects radially inwardly therefrom to define a generally central aperture area through which solar radiation can pass into the cavity receiver. A non-structural, laminated blanket is spread over the rigid support truss in such a manner as to define an outer surface area and an inner surface area diverging radially outwardly from the central aperture area toward the periphery of the inlet. The outer surface area faces away from the inlet and the inner surface area faces toward the cavity receiver. The laminated blanket includes at least one layer of material, such as ceramic fiber fabric, having high infra-red emittance and low solar absorption properties, and another layer, such as metallic foil, of low infra-red emittance properties.

23 Claims, 2 Drawing Sheets

SOLAR ENERGY APPARATUS WITH APERTURED SHIELD

The invention described herein was made in the performance of work under NASA Prime Contract No. NAS3-24666/R50PIB85560969 and is subject to provisions of Section 305 of the National Aeronautics and Space Act of 1958 (72 Stat. 435; 42 U.S.C. 2457)

FIELD OF THE INVENTION

This invention generally relates to solar energy apparatus and, particularly, to a protective shield assembly defining an aperture to the apparatus.

BACKGROUND OF THE INVENTION

Spacecraft, satellites or the like may include a space platform mounted thermal or solar energy system. Solar energy receivers of various sorts are employed to power on-board systems while in orbit, for instance. Since, in many instances, the orbit of the spacecraft or satellite follows a path that is in the interposition of the earth between the sun, thereby blocking the solar energy receiver from the source of solar energy, some sort of energy storage device is required. In other words, solar energy receivers normally are designed to receive sufficient energy to power on-board systems while illuminated by the sun as well as to provide sufficient energy to an energy storage device as to operate the systems when the receiver is not so illuminated.

Other considerations include the concern of reliability of the system. A breakdown in a system in a spacecraft may endanger the mission of the spacecraft and, because satellites are not easily retrieved, it is necessary that the systems be highly reliable and not subject to failure in hostile environments of space.

For instance, one of the areas of most concern and unreliability is the apertured radiation shield constructed about the solar energy receiver. Shields may be completely fabricated of rigid and/or structural components, and coated with a rigid or brittle ceramic material on a substrate structure. Such constructions may experience cracking problems during launch and subsequent orbital thermal cycling.

The complex needs served by the radiation shields often are compromised to accomplish other functions. Such shields must have high infra-red emittance and low solar absorption to minimize temperature excursions due to impingement of solar radiation. The shields must have high temperature capability to survive during "off-pointing" conditions when concentrated solar energy is incident upon the radiation shield. The shield also must have good infrared radiation insulation properties to reduce radiation losses from the solar energy receiver through the shield.

This invention is directed to solving the above problems while still satisfying the complex needs required of an apertured radiation shield.

SUMMARY OF THE INVENTION

An object, therefore, of the invention is to provide a protective apertured shield means for use in an apparatus for absorbing concentrated solar energy, the apparatus including a cavity receiver with an inlet, and the protective shield means being provided about the inlet.

In the exemplary embodiment of the invention, the shield means include rigid support means fixed to the periphery of the inlet to the cavity receiver, with the rigid support means projecting radially inwardly from the inlet periphery to define a generally central aperture area through which the solar radiation can pass into the cavity receiver. Non-structural blanket means are spread over the rigid support means between the periphery of the inlet and the aperture area. The material has a high temperature capability and provides for infrared radiation insulation.

The rigid support means include truss means projecting inwardly from the periphery of the inlet to the cavity receiver. The truss means include an outer ring component around the periphery of the inlet, an inner ring component defining the aperture area, and generally triangulated span components diverging outwardly from the inner ring component to the periphery of the cavity receiver.

The non-structural blanket means are spread over the truss means to define an outer surface area and an inner surface area diverging from the central aperture area to the cavity receiver. The outer surface area of the blanket means faces away from the receiver and the inner surface area faces toward the cavity receiver.

The material of the non-structural blanket means is laminated and includes at least one layer of high infra-red emittance and low solar absorption properties, and another layer of low infra-red emittance properties. The laminated material is oriented such that the one layer is on the outside of the outer surface area to face away from the receiver inlet and on the inside of the inner surface area to face toward the cavity receiver. The one layer may be fabricated of ceramic fiber fabric and the other layer may be fabricated of metallic foil. The exemplary embodiment utilizes two of the ceramic fiber fabric layers juxtaposed onto the metal foil.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
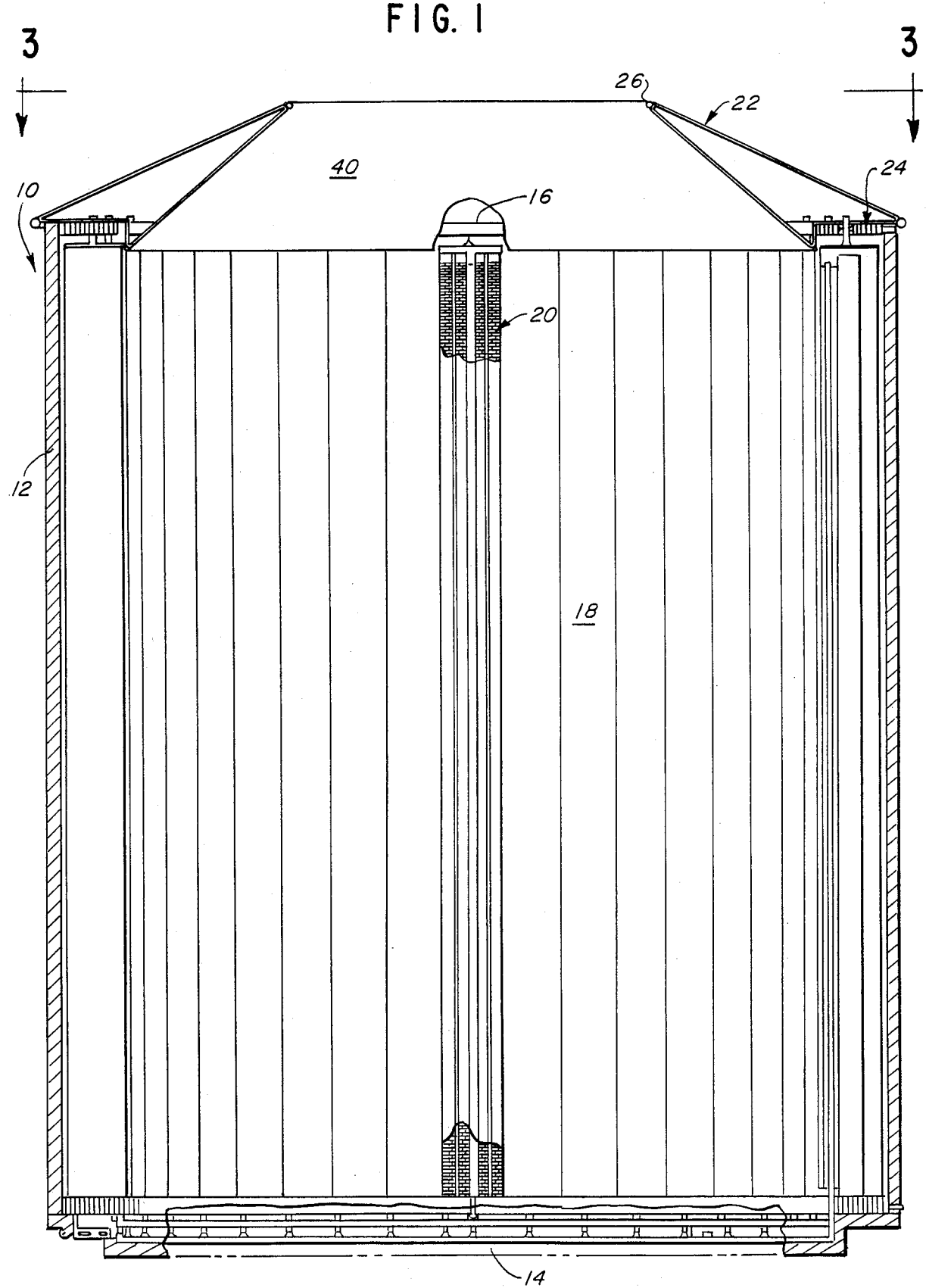
FIG. 1 is an axial section through a solar energy apparatus incorporating the protective apertured shield of the invention.

Referring to the drawings in greater detail, and first to FIG. 1, a solar energy apparatus, generally designated 10, is illustrated and shown to include a generally cylindrical housing 12 having a closed end 14 and an open end 16. The open end defines an inlet to a cavity receiver 18. The apparatus is of somewhat conventional design and includes a plurality of heat pipe/boiler tube composite structures, generally designated 20, surrounding or lining the inner cylindrical surface of housing 12. The apparatus may be employed as a solar energy receiver to power on-board systems of spacecraft or satellites, for instance. Such receivers not only receive energy while illuminated by the sun, but they provide sufficient storage to operate systems of the spacecraft when the receiver is not illuminated. To this end, a reflector (not shown) often is mounted on a space platform which also may support the apparatus itself, for reflecting concentrated solar energy through inlet 16 to cavity receiver 18.

The invention concerns a protective apertured shield means, generally designated 22, which is mounted generally about the periphery 24 of inlet 16 to cavity receiver 18 to define a generally central aperture area 26 through which solar radiation can pass into the cavity receiver and to contain a substantial portion of the captured energy.

Figure 2:
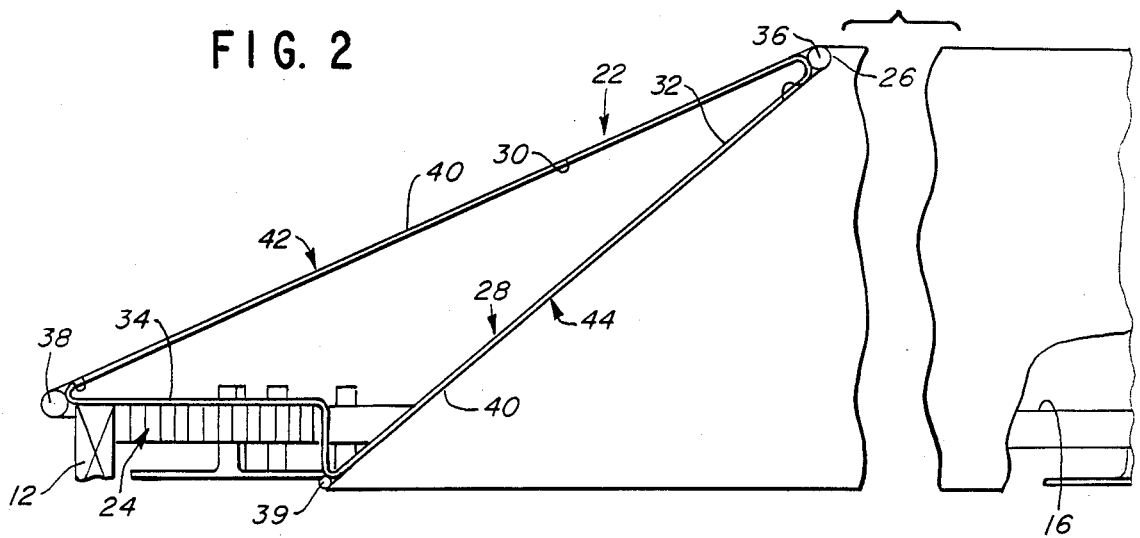
FIG. 2 is an enlarged axial section of the protective apertured shield isolated from the cavity receiver of the solar energy appartus.
Figure 3:
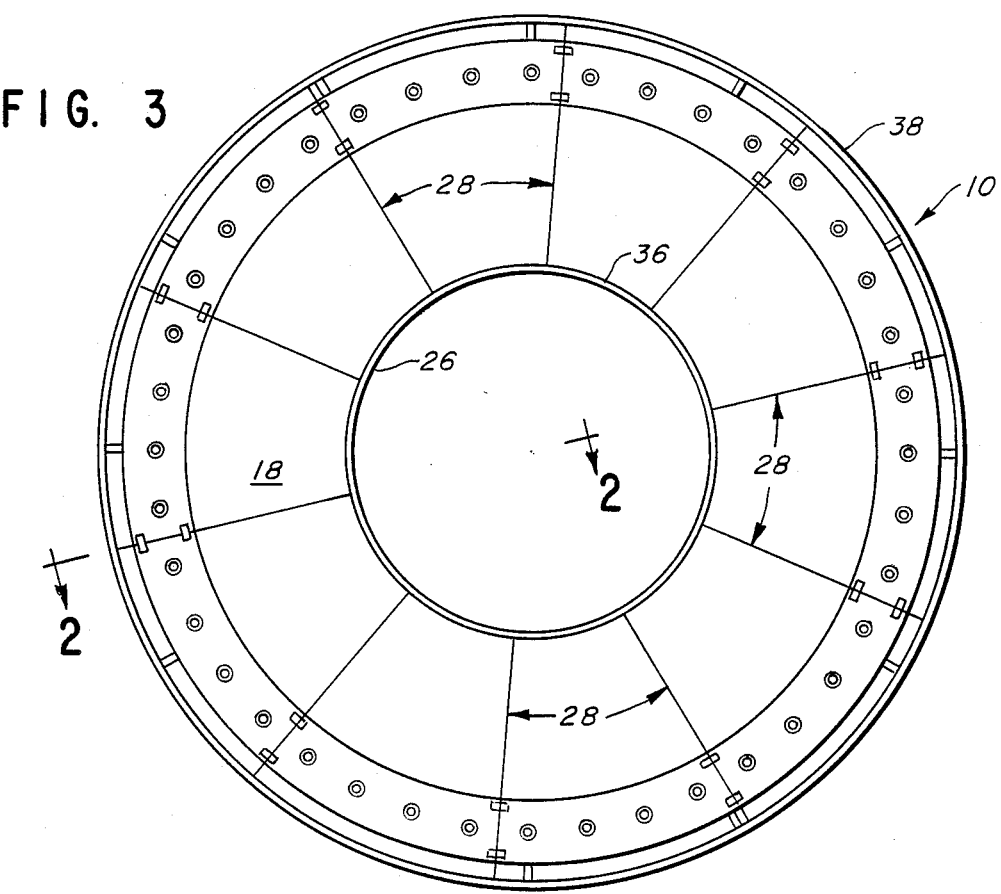
FIG. 3 is an end elevational view looking in the direction of line 3—3 of FIG. 1, with the non-structural blanket means of the protective apertured shield removed to better illustrate the rigid support means for the blanket means.

Referring to FIGS. 2 and 3 in conjunction with FIG. 1, generally, rigid support means are fixed to the periphery of inlet 16 in a manner to project radially inwardly therefrom to define central aperture area 26. A non-structural blanket is spread over the rigid support means between the periphery of the inlet and the aperture area 26. The blanket material has a high temperature capability and provides for infra-red radiation insulation. More particularly (and it should be noted that the non-structural blanket is removed in the illustration of FIG. 3) the rigid support means include a plurality of truss members, generally designated 28, equally spaced angularly about central aperture area 26. The spacing and angular disposition of truss members 28 are best shown in FIG. 3. FIG. 2 shows that each truss member 28 is triangularly configured to include an axially outer span component 30, an axially inner span component 32 and a joining component 34 between the radially outer ends of span components 30,32. Joining span component 34 is rigidly fixed to the periphery 24 of cavity receiver 18 (FIG. 1) whereby each truss member 28 defines span means diverging radially outwardly and axially inwardly from central aperture area 26 to periphery 24 of the cavity receiver. The rigid support means also include an inner ring component 36 which defines central aperture area 26, an outer ring component 38 at the outside edge about housing 12 and another outer ring component 39 at the inside edge about housing 12. Therefore, inner ring 36, outer ring 38 and truss members 28 from a truss means or arrangement completely surrounding central aperture area 26 as seen in FIG. 3, projecting radially inwardly from the periphery of the apparatus.

The invention contemplates a non-structural blanket means 40 spread over the entire truss arrangement whereby the blanket defines an outer surface area, as indicated at 42, facing away from inlet 16 to cavity receiver 18, and an inner surface area, as indicated at 44, facing toward cavity receiver 18. Therefore, inlet 16 to cavity receiver 18 is blocked by protective apertured shield 22, except for central aperture area 26 which provides for transmission of concentrated solar energy into the cavity receiver. The shield limits escape of the energy from the receiver due to the angular orientation of the shield, the reflective solar properties of the cavity receiver facing surface of the shield and the low infra-red radiation losses through the shield.

Non-structural blanket 40 is fabricated of laminated material which includes at least one layer of high infra-red emittance and low solar absorption properties. This layer may comprise a ceramic fiber fabric. The laminated material also includes another layer of metallic foil laminated to the ceramic fiber fabric. Preferably, two juxtaposed layers of ceramic fiber fabric are laminated to the metallic foil. The laminated material so constructed is spread about the rigid support truss structure in such an orientation that the ceramic fiber fabric layers are disposed on the outside of outer surface area 42 to face away from inlet 16 and cavity receiver 18, and on the inside of inner surface area 44 to face toward the cavity receiver. The metallic foil layer then is disposed inside the truss construction so that, in essence, metal foil layers face each other on the interior of the supporting truss construction. The composite, laminated blanket is wrapped about inner ring component 36 (FIG. 2) so that the blanket surrounds the supporting truss structure and is joined to form a continuous, i.e. a single sheet of laminated material. Therefore, the single sheet defines both outer surface area 42 and inner surface area 44 of the protective apertured shield 22.

The ceramic fiber fabric provides for high infra-red emittance and low solar absorption properties. The metallic foil provides for good infra-red radiation insulation. Both the ceramic fiber fabric and the metallic foil have high temperature capabilities. A commercial brand of ceramic fiber fabric may comprise a Nextel 312 fabric. In essence, non-structural blanket is fabricated of two "outside" layers of ceramic fiber fabric and one "inside" layer of a high temperature metallic foil.

From the foregoing, it can be understood that the ceramic fiber fabric on the outside of the protective apertured shield has the appropriate surface properties of high emittance and low absorption to allow the outer surface area 42 to remain relatively cool when subjected to solar radiation. Due to the high continuous duty temperature of this material, no active cooling of the shield means is required. With the fabric layers minimizing transmittance, the foil layer negates any residual transmittance of the fabric layers. Since the foil has a low emittance, the amount of infra-red radiation emitted from the inner surface area 30 to the inner surface area 32 is decreased and vice versa. Consequently, the re-radiation losses through the shield are reduced as the foil layer functions as a multi-layer insulation. Any solar radiation reflected from the cavity receiver that impinges on the shield is preferentially re-reflected back to the cavity receiver due to the low solar absorptance properties of the cavity receiver facing surface of the shield. All of the sheet materials used in the shield are non-structural in nature. Therefore, the cracking associated with coatings on conventional shield structures are not a problem. In addition, the non-structural materials are considerably lighter in weight than the shield structures of the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an apparatus for absorbing a beam of concentrated solar energy and which includes a cavity receiver with an inlet for transmission thereinto of solar radiation, a protective apertured shield means about the inlet comprising:

rigid support means fixed to the periphery of the inlet and projecting radially inwardly therefrom to define a generally central aperture area through which the solar radiation can pass into the cavity receiver; and non-structural blanket means spread over the rigid support means between the periphery of the inlet and the aperture area, the material having a high temperature capability and providing for infra-red radiation insulation, while remaining relatively cool when subjected to solar radiation.

2. The protective shield means of claim 1 wherein said rigid support means include truss means projecting inwardly from the periphery of the inlet.

3. The protective shield means of claim 2 wherein said truss means include a component surrounding the aperture area and fixed to distal ends of the truss components.

4. The protective shield means of claim 2 wherein said truss means include an outer ring component around the periphery of the inlet, an inner ring component defining the aperture area and span components diverging outwardly from the inner ring component.

5. The protective shield means of claim 4 wherein said non-structural blanket means are spread over the truss means and wrapped about said inner ring component to define an outer surface area and an inner surface area diverging radially outwardly from the central aperture area, the outer surface area facing away from the inlet and the inner surface area facing toward the cavity receiver.

6. The protective shield means of claim 2 wherein said non-structural blanket means are spread over the truss means to define an outer surface area and an inner surface area diverging radially outwardly from the central aperture area, the outer surface area facing away from the inlet and the inner surface area facing toward the cavity receiver.

7. The protective shield means of claim 1 wherein the material of said non-structural blanket means is laminated and includes at least one layer of high infra-red emittance and low solar absorption properties and another layer of high radiation insulation properties.

8. The protective shield means of claim 7 wherein said laminated material include two of said one layers.

9. The protective shield means of claim 7 wherein said one layer is fabricated of a ceramic fiber fabric.

10. The protective shield means of claim 7 wherein said other layer is fabricated of metal foil.

11. The protective shield means of claim 10 wherein said one layer is fabricated of a ceramic fiber fabric.

12. The protective shield means of claim 7 wherein said laminated material is spread over the rigid support means in such a manner as to provide an outer surface area and an inner surface area diverging radially outwardly from the central aperture area, the outer surface area facing away from the inlet and the inner surface area facing toward the cavity receiver.

13. The protective shield means of claim 12 wherein said laminated material is oriented such that said one layer is on the outside of the outer surface area to face away from the inlet and on the inside of the inner surface area to face toward the cavity receiver.

14. The protective shield means of claim 13 wherein said one layer is fabricated of a ceramic fiber fabric.

15. The protective shield means of claim 14 wherein said other layer is fabricated of metal foil.

16. The protective shield means of claim 15 wherein said one layer is fabricated of a ceramic fiber fabric.

17. The protective shield means of claim 16 wherein said laminated material include two of said one layers.

18. In an apparatus for absorbing concentrated solar energy and which includes a cavity receiver with an inlet for transmission thereinto of solar radiation, a protective apertured shield means about the inlet comprising:

rigid truss means fixed to the periphery of the inlet and projecting radially inwardly therefrom and including a support component surrounding and defining a generally central aperture area through which the solar radiation can pass into the cavity receiver, the rigid truss means diverging radially outwardly from the central aperture area; and a laminated blanket spread over the truss means and wrapped about said support component between the periphery of the inlet and the central aperture area to define an outer surface area and an inner surface area diverging from the central aperture area, the outer surface area facing away from the inlet and the inner surface area facing toward the cavity receiver, the material of the laminated blanket including at least one layer of high infra-red emittance and low solar absorption properties and another layer of low infra-red emittance properties.

19. The protective shield means of claim 18 wherein said truss means include an outer ring component around the periphery of the inlet, an inner ring component defining the aperture area and span components diverging outwardly from the inner ring component.

20. The protective shield means of claim 18 wherein said laminated material include two of said one layers.

21. The protective shield means of claim 18 wherein said one layer is fabricated of a ceramic fiber fabric.

22. The protective shield means of claim 21 wherein said other layer is fabricated of metal foil.

23. The protective shield means of claim 22 wherein said one layer is fabricated of a ceramic fiber fabric.

* * * * *